United States Patent Office 3,464,591
Patented Sept. 2, 1969

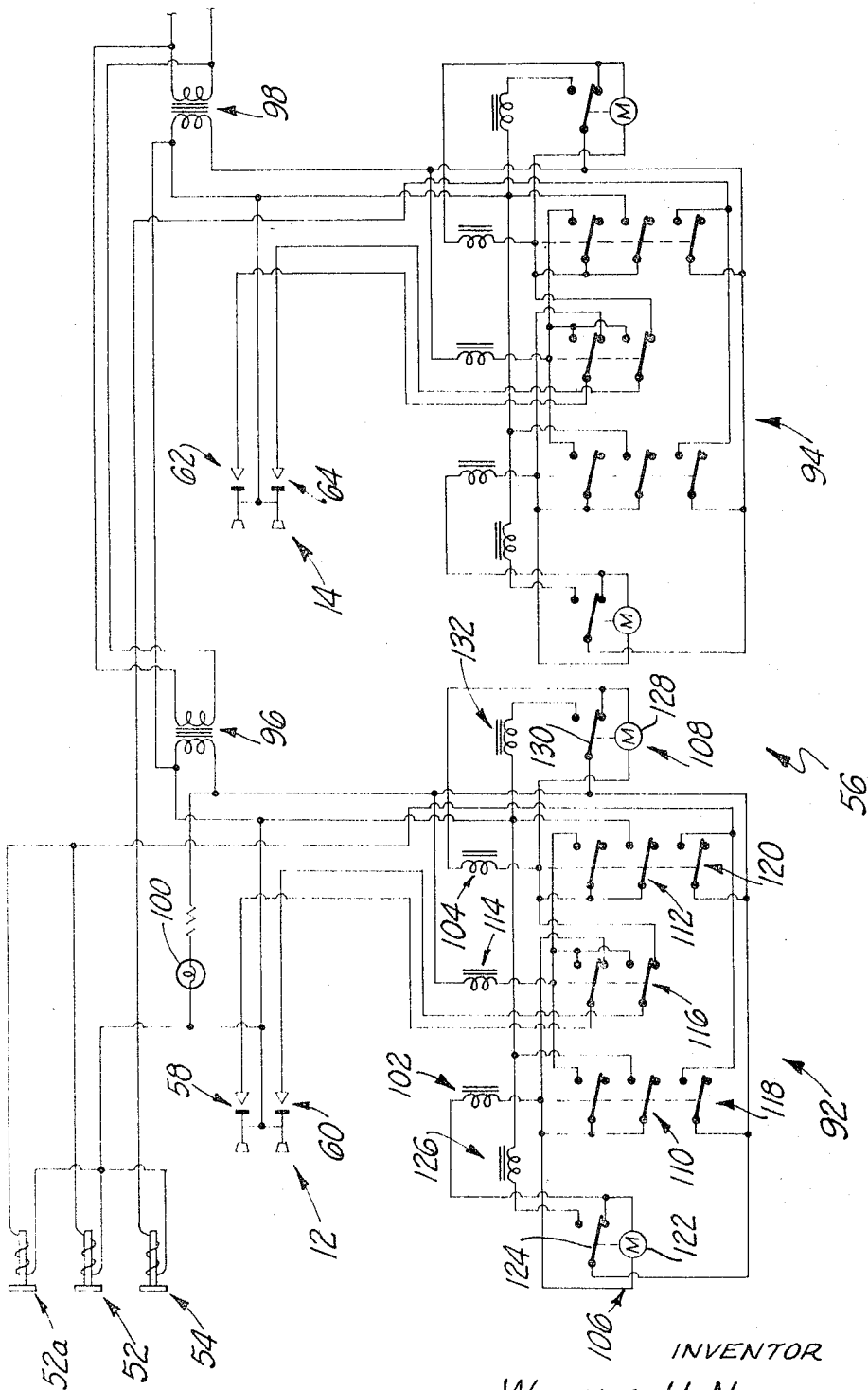

3,464,591
DUAL-TAP BEER DISPENSING APPARATUS
William H. Nicola, Garden Grove, Calif., assignor to Swingspout Measure Co., Los Angeles, Calif., a corporation of California
Continuation of application Ser. No. 599,876, Dec. 7, 1966. This application Mar. 20, 1968, Ser. No. 714,749
Int. Cl. B67d 5/24, 5/52, 5/60
U.S. Cl. 222—30                                              5 Claims

ABSTRACT OF THE DISCLOSURE

A beer dispensing apparatus having two serving taps in side-by-side relation and sufficiently close together to permit both to discharge into the same beer pitcher simultaneously, yet far enough apart to permit them to discharge into separate beer glasses. The serving taps are controlled by normally-closed solenoid valves which are energized simultaneously by either a glass timer or a pitcher timer. The glass timer energizes both solenoid valves for a length of time sufficient to cause each serving tap to dispense a glass of beer, and the pitcher timer energizes the solenoid valves long enough to cause each serving tap to dispense one-half of a pitcher of beer. The two timers are controlled by manually-operated glass and pitcher switches, respectively.

---

This application is a continuation of Ser. No. 599,876, filed Dec. 7, 1966 now abandoned.

Cross-references to related applications

Ser. Nos. 521,109, now Patent No. 3,380,653 and 521,202, now abandoned, both filed Jan. 17, 1966 by Scott E. Allen and me.

Background of the invention

The invention relates to the field of dispensing beer from kegs, or other sources of beer under pressure.

Conventionally, establishments selling draft beer are provided with serving taps each of which is used to dispense glasses or pitchers of beer depending upon customers' orders. Although a conventional serving tap will dispense a glass of beer in a reasonable length of time, obtaining a pitcher of beer therefrom is a time consuming operation.

Summary and objects of the invention

The invention has as its principal purpose the provision of a beer dispensing apparatus which will dispense beer much more rapidly than prior installations, and without any deleterious effects, so that a bartender can serve more customers than formerly.

A primary object of the invention is to provide a dual-tap beer dispensing apparatus comprising two beer dispensing taps positioned in side-by-side relation with their depending discharge spouts so located that they may be used simultaneously to fill two glasses, or may be used simultaneously to fill a single pitcher more rapidly.

More particularly, an important object of the invention is to provide a dual-tap beer dispensing apparatus wherein the distance between the inner, adjacent sides of the discharge spouts is greater than twice the wall thickness of the open upper end of a beer glass so that two beer glasses may be telescoped upwardly over the discharge spouts, respectively, at the same time, and wherein the distance between the outer sides of the discharge spouts is less than the maximum inside dimension of the open upper end of a beer pitcher so that the beer pitcher may be telescoped upwardly over both of the discharge spouts.

Another object of the invention is to provide a dual-tap dispensing apparatus of the foregoing character which includes: beer supply means comprising a source of beer under substantially constant pressure and flow lines leading from the source to the beer dispensing taps; normally-closed solenoid valves in the flow lines, respectively; and manually-operable switch means for simultaneously energizing the solenoid valves.

An important object is to provide a dual-tap dispensing apparatus wherein the manually-operable switch means includes manually-operable glass and pitcher switches, and wherein the apparatus includes means responsive to actuation of the glass switch for energizing the solenoid valves for an interval of time sufficient to dispense a glass of beer from each serving tap, and means responsive to actuation of the pitcher switch for energizing the solenoid valves for an interval of time sufficient to dispense one-half of a pitcher of beer from each serving tap.

Another object of the invention is to provide a dual-tap beer dispensing apparatus having control circuit means which includes glass and pitcher timing means for measuring the respective intervals of time required to dispense a glass of beer and one-half of a pitcher of beer from each serving tap, the glass and pitcher timing means respectively being energizable by the manually-operable glass and pitcher switches.

The foregoing objects, advantages, features and results of the present invention, together with various other objects, advantages, features and results thereof which will be evident to those skilled in the beer dispensing art in the light of this disclosure, may be achieved with the exemplary embodiment of the invention described in detail hereinafter and illustrated in the accompanying drawings.

Description of the drawings

FIG. 4 is is a wiring diagram showing a control circuit means of the dual-tap beer dispensing apparatus of the invention.

Detailed description of the invention

Figure 1:
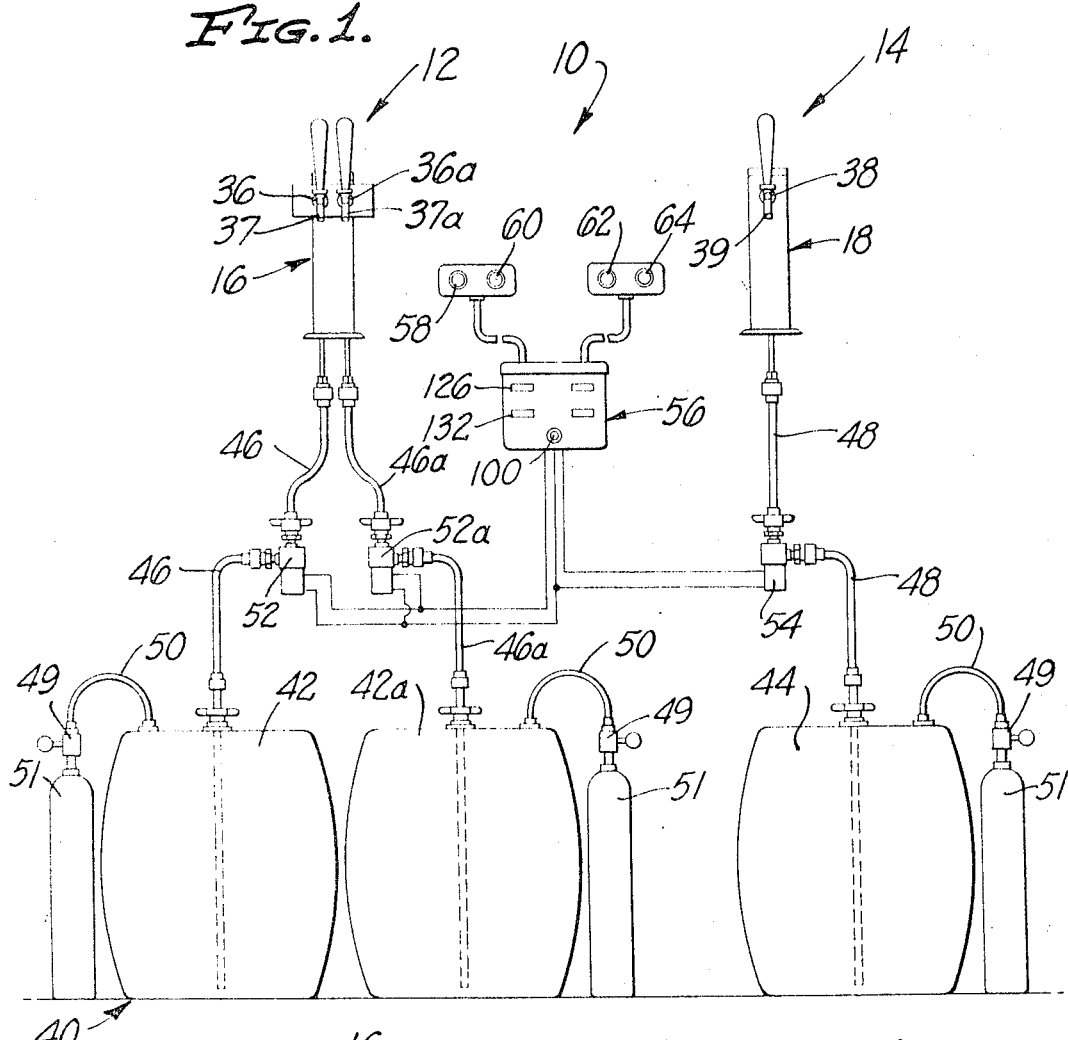
FIG. 1 is a diagrammatic view of a beer dispensing system incorporating two beer dispensing stations one of which embodies the dual-tap beer dispensing apparatus of the invention.

Referring initially to FIG. 1 of the drawings, illustrated therein is a beer dispensing system which embodies the invention and which is designated generally by the numeral 10. The beer dispensing system 10 is shown as including two dispensing or serving stations 12 and 14, although this number may be varied without departing from the invention.

Located at the dispensing station 12 is a dual-tap dispensing apparatus 16 of the invention. A conventional single-tap dispensing apparatus 18 is located at the dispensing station 14, although the dual-tap dispensing apparatus 16 of the invention may be located at more than one dispensing station in any dispensing station in which it is used.

The dual-tap dispensing apparatus 16 of the invention includes two conventional manually-operable dispensing or serving taps 36 and 36a in side-by-side relation, the serving taps 36 and 36a terminating in spaced, parallel, depending discharge spouts 37 and 37a. The dispensing apparatus 18 includes a single dispensing or serving tap 38 having a depending discharge spout 39.

The serving taps 36, 36a and 38 are supplied from a source of beer under substantially constant pressure. In the particular beer dispensing system 10 shown, the constant-pressure source comprises individual kegs 42, 42a and 44 respectively connected to the serving taps 36, 36a and 38 by flow lines 46, 46a and 48. The pressure in each of the kegs 42, 42a and 44 is maintained substantially constant as beer is withdrawn therefrom by a pressure regulator 49 in a pressure line 50 connecting the corresponding keg to a suitable pressure source 51. The latter may be a conventional pressure tank containing carbon dioxide, or other suitable gas, under pressure.

Installed in the respective flow lines 46, 46a and 48, between the kegs 42, 42a and 44 and the respective serving taps 36, 36a and 38, are normally-closed solenoid valves 52, 52a and 54 which are energized for predetermined intervals of time to dispense predetermined measured quantities, the quantities dispensed being directly proportional to the times that the solenoid valves are energized because of the substantially constant pressures maintained in the kegs 42, 42a and 44. The solenoid valves 52, 52a and 54 are controlled by a control unit 56 which will be described in more detail hereinafter in connection with FIG. 4 of the drawings. Suffice it to say for the present that the control unit 56 determines the intervals of time that the solenoid valves 52, 52a and 54 are energized, and thus determines the quantities of beer dispensed thereby, the control unit also recording the numbers of glasses and pitchers dispensed. The control unit 56 is actuated by manually-operated, glass-dispensing and pitcher-dispensing switches 58 and 60 at the serving or bartending station 12, and by manually-operated, glass-dispensing and pitcher-dispensing switches 62 at 64 at the station 14. Preferably, the control unit 56 is located remotely from the bartending stations 12 and 14, and is preferably sealed so that it cannot be tampered with.

Before considering the control unit 56 in detail, the operation of the dual-tap dispensing apparatus 16, and the advantageous results attainable therewith, will be described.

Figure 2:
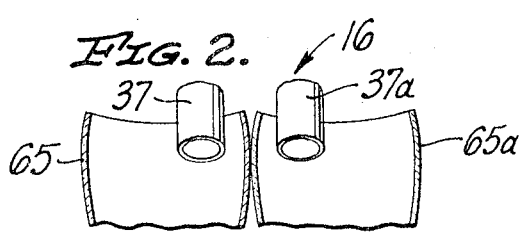
FIG. 2 is a fragmentary view illustrating the operation of the dual-tap beer dispensing apparatus of the invention in filling two beer glasses simultaneously from two adjacent serving taps.

Referring to FIG. 2 of the drawings, an important feature of the invention is that the distance between the inner, adjacent sides of the discharge spouts 37 and 37a of the serving taps 36 and 36a is greater than twice the wall thickness of the open upper end of a beer glass so that two beer glasses 65 and 65a may be telescoped upwardly over the discharge spouts, respectively, at the same time. Upon closure of the manually-operable glass switch 58, the control unit 56, as will be described hereinafter, causes the solenoid valves 52 and 52a to open for the interval of time required to fill the respective glasses 65 and 65a. As will be apparent, filling the two glasses 65 and 65a simultaneously in this manner results in a considerable saving of the bartender's time.

Preferably, the glass switch 58 is so located that it may be operated by the bartender's knee or foot, thereby leaving both of his hands free to hold the glasses 65 and 65a under the respective discharge spouts 37 and 37a. However, a bartender with reasonable dexterity can hold both of the glasses 65 and 65a under the respective discharge spouts 37 and 37a with one hand, and operate the glass switch 58 with his other hand.

Figure 3:
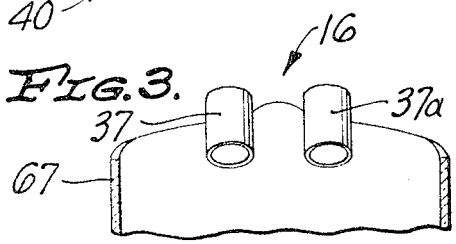
FIG. 3 is a view which is similar to FIG. 2, but which illustrates the operation of the invention in filling a beer pitcher from the two adjacent serving taps simultaneously.

Referring to FIG. 3 of the drawings, the distance between the outer sides of the discharge spouts 37 and 37a is less than the maximum inside dimension of the open upper end of a convenional beer pitcher 67 so that the pitcher may be telescoped upwardly over both of the discharge spouts. With this construction, the pitcher 67 may be filled with beer from both serving taps 36 and 36a simultaneously, thereby cutting in half the time required to fill the pitcher. It will be understood that the control unit 56 is so set as to cause each of the solenoid valves 52 and 52a to remain open for the interval of time required to dispense one-half of a pitcher of beer so that, together, the two serving taps 36 and 36a dispense a full pitcher. The pitcher switch 60 for causing the control unit 56 to dispense a pitcher of beer from the serving taps 36 and 36a may be in any suitable location, accessible to hand, knee, or foot.

In order to accommodate either two conventional beer glasses or a conventional beer pitcher easily, the two discharge spouts 37 and 37a have their inner, adjacent sides spaced apart at least about one-half inch, and have their outer sides spaced apart not more than about three inches. Spacings within these ranges will accommodate all conventional beer glasses, beer mugs, and beer pitchers readily.

Turning now to a more detailed consideration of the control unit 56, it will be understood that this unit completely controls the dispensing of beer from the serving taps 36, 36a and 38, the manual valves incorporated in these serving taps being left open. Referring to FIG. 4 of the drawings, in the particular beer dispensing system 10 under consideration, the control unit 56 includes two control circuit means 92 and 94 respectively powered by parallel-connected transformers 96 and 98. An indicator light 100 indicates that the control unit 56 is in operation.

The two control circuit means 92 and 94 respectively correspond to the two bartending stations 12 and 14. The control circuit means 92 controls the solenoid valves 52 and 52a, while the control circuit means 94 controls the solenoid valve 54. The manually-operated, glass-dispensing and pitcher-dispensing switches 58 and 60 at the bartending station 12 operate the control circuit means 92. Similarly, the glass-dispensing and pitcher-dispensing switches 62 and 64 at the bartending station 14 operate the control circuit means 94. The two control circuit means 92 and 94 are substantially identical so that only the control circuit means 92 will be described.

The glass and pitcher switches 58 and 60 are preferably push button switches which are closed only momentarily. When closed, the switches 58 and 60 respectively energize glass-dispensing and pitcher-dispensing relays 102 and 104 and glass-dispensing and pitcher-dispensing timers 106 and 108. The relays 102 and 104 are respectively provided with holding contact means 110 and 112 which establish holding circuits through the respective relays 102 and 104, through the respective timers 106 and 108, and through another relay 114, the latter having contact means 116 which de-activates the switches 58 and 60. Consequently, once one of the switches 58 or 60 has been closed momentarily to energize the corresponding relay 102 or 104, the corresponding timer 106 or 108, and the relay 114, any subsequent actuations of the switches 58 and 60 are ineffective. Consequently, it is impossible by repeated actuations of the switch 58 or 60, to dispense more than the metered quantity of beer corresponding to the switch initially actuated, which is an important feature of the invention.

The relays 102 and 104 respectively include contact means 118 and 120 for energizing the solenoid valves 52 and 52a, which are connected in parallel. The length of time that these solenoid valves remain energized depends upon whether the glass-dispensing timer 106 or the pitcher-dispensing timer 108 was initially energized by the glass-dispensing switch 58 or the pitcher-dispensing switch 60.

At the end of the interval of time required to dispense a glass of beer from each of the serving taps 36 and 36a, the motor 122 of the timer 106 moves a two-position switch 124 thereof into a position to energize a counter 126 which records the fact that two glasses of beer have been dispensed. At the same time, the switch 124 de-energizes the relay 102, the timer 106 and the relay 114, the timer being of a type which is returned to its starting position automatically upon de-energization thereof, as disclosed in the aforementioned co-pending application Ser. No. 521,202.

Similarly, at the end of the interval of time required to dispense one-half of a pitcher of beer from each of the serving taps 36 and 36a, the motor 128 of the timer 108 moves a two-position switch 130 thereof into a position to energize a counter 132 for recording the fact that a pitcher of beer has been dispensed from the two taps mentioned. At the same time, the timer switch 130 de-energizes the relay 104, the timer 108 and the relay 114, the timer 108 also returning automatically to its starting position.

Thus, it will be apparent that in order to dispense two glasses of beer from the serving taps 36 and 36a at the bartending station 12, it is merely necessary to close the push button switch 58 momentarily. This energizes the relay 102, through the contact means 116 of the relay 114, whereupon the relay 102 establishes its own holding circuit, through the holding contact means 110; energizes the relay 114 to de-activate the push button switches 58 and 60; and energizes the solenoids 52 and 52a through the contact means 118. Also, the timer 106 is energized. At the end of the interval of time required to dispense two glasses of beer, the timer switch 124 actuates the counter 126 to record the two glasses, and simultaneously de-energizes the relay 102, the timer 106, the relay 114 and the solenoid valves 52 and 52a to ready the control circuit means 92 for operation to dispense two more glasses of beer upon momentary closure of the switch 58, or a pitcher of beer upon momentary closure of the switch 60. The control circuit means 92 operates in essentially the same manner upon momentary closure of the pitcher-dispensing switch 60, so that a further description is not necessary, except to point out that each of the serving taps 36 and 36a dispenses one-half of a pitcher of beer.

The control circuit means 94 operates in substantially the same manner as the control circuit means 92 to dispense either a single glass or a pitcher of beer at the bartending station 14. Consequently, it is unnecessary to describe the control circuit means 94 in detail.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:
1. A dual beer dispensing apparatus, comprising:
   (a) two beer dispensing spouts positioned in side-by-side relation;
   (b) the distance between the inner, adjacent sides of said spouts being greater than twice the wall thickness of the open upper end of a beer glass so that two beer glasses may be telescoped upwardly over said spouts, respectively, at the same time;
   (c) the distance between the outer sides of said spouts being less than the maximum inside dimension of the open upper end of a beer pitcher so that the beer pitcher may be telescoped upwardly over both of said spouts at the same time;
   (d) beer supply means for delivering beer to said spouts simultaneously at substantially equal flow rates so as to fill either two beer glasses simultaneously from said spouts, respectively, or a beer pitcher from said spouts collectively;
   (e) said beer supply means including a source of beer under pressure and flow lines respectively leading from said source to said spouts;
   (f) two normally-closed electrically-operable valves in said flow lines, respectively;
   (g) manually-operable switch means for simultaneously energizing said valves, comprising manually-operable glass and pitcher switches;
   (h) means responsive to actuation of said glass switch for energizing said valves for an interval of time sufficient to dispense a glass of beer from each of said spouts; and
   (i) means responsive to actuation of said pitcher switch for energizing said valves for an interval of time sufficient to dispense one-half of a pitcher of beer from each of said spouts.

2. A dual beer dispensing apparatus, comprising:
   (a) two beer dispensing spouts positioned in side-by-side relation;
   (b) the distance between the inner, adjacent sides of said spouts being greater than twice the wall thickness of the open upper end of a beer glass so that two beer glasses may be telescoped upwardly over said spouts, respectively, at the same time;
   (c) the distance between the outer sides of said spouts being less than the maximum inside dimension of the open upper end of a beer pitcher so that the beer pitcher may be telescoped upwardly over both of said spouts at the same time;
   (d) beer supply means for delivering beer to said spouts simultaneously at substantially equal flow rates so as to fill either two beer glasses simultaneously from said spouts respectively, or a beer pitcher from said spouts collectively;
   (e) said beer supply means including a source of beer, two flow lines leading from said source to said spouts, respectively, and means for maintaining the beer in said source at a substantially constant pressure,
   (f) two normally-closed electrically-operable valves in said flow lines, respectively;
   (g) control circuit means connected to said valves for energizing same for intervals of time respectively sufficient to dispense a glass of beer and one-half of a pitcher of beer from each of said spouts;
   (h) said control circuit means including glass and pitcher timing means for respectively establishing said intervals of time to dispense a glass of beer and one-half of a pitcher of beer from each of said spouts; and
   (i) said control circuit means further including manually-operable glass and pitcher switches for respectively energizing said glass and pitcher timing means.

3. A dual beer dispensing apparatus according to claim 2 wherein said spouts respectively form parts of manually-operable serving taps, whereby one of said manually-operable serving taps may be closed manually and the other opened so as to dispense a glass of beer from said spout of said other serving tap only upon actuation of said manually-operable glass switch.

4. A dual beer dispensing apparatus, comprising:
   (a) two beer dispensing spouts positioned in side-by-side relation;
   (b) the distance between the inner, adjacent sides of said spouts being greater than twice the wall thickness of the open upper end of a beer glass so that two beer glasses may be telescoped upwardly over said spouts, respectively, at the same time;
   (c) beer supply means for delivering beer to said spouts simultaneously at substantially equal flow rates so as to fill two beer glasses simultaneously from said spouts, respectively;
   (d) said beer supply means including a source of beer, two flow lines leading from said source to said spouts, respectively, and means for maintaining the beer in said source at a substantially constant pressure;
   (e) two normally-closed electrically-operable valves in said flow lines, respectively;
   (f) control circuit means connected to said valves for energizing said valves simultaneously for an interval of time sufficient to dispense a glass of beer from each of said spouts;
   (g) said control circuit means including glass timing means for establishing said interval of time to dispense a glass of beer from each of said spouts;

(h) said control circuit means further including a single manually-operable glass switch for energizing said glass timing means, and (i) counter means operable in response to operation of said switch for registering the number of glasses of beer dispensed, said spouts respectively forming parts of manually-operable service taps, whereby one of said manually-operable serving taps may be closed manually and the other opened so as to dispense a glass of beer from said spout of said other serving tap only upon actuation of said manually-operable glass switch.

5. A dual beer dispensing apparatus, comprising:

(a) two beer dispensing spouts positioned in side-by-side relation;

(b) the distance between the outer sides of said spouts being less than the maximum inside dimension of the open upper end of a beer pitcher so that the beer pitcher may be telescoped upwardly over both of said spouts;

(c) beer supply means for delivering beer to said spouts simultaneously at substantially equal flow rates so as to fill a beer pitcher from said spouts collectively;

(d) said beer supply means including a source of beer, two flow lines leading from said source to said spouts, respectively, and means for maintaining the beer in said source at a substantially constant pressure;

(e) two normally closed electrically-operable valves in said flow lines, respectively;

(f) control circuit means connected to said valves for energizing same for an interval of time sufficient to dispense one-half of a pitcher of beer from each of said spouts;

(g) said control circuit means including pitcher timing means for establishing said interval of time to dispense one-half of a pitcher of beer from each of said spouts; and (h) said control circuit means further including a manually-operable pitcher switch for energizing said pitcher timing means so as to fill a beer pitcher from said spouts collectively.

References Cited
UNITED STATES PATENTS 2,739,461    3/1956    Canter _____ 222—179 X ROBERT B. REEVES, Primary Examiner H. S. LANE, Assistant Examiner U.S. Cl. X.R.

222—70, 135, 144.5

PO-1050
(5/69)

UNITED STATES PATENT OFFICE
CERTIFICATE OF CORRECTION

Patent No. 3,464,591   Dated Sept. 2, 1969

Inventor(s) William H. Nicola

It is certified that error appears in the above-identified patent and that said Letters Patent are hereby corrected as shown below:

```
Column 8, following the line that reads
 "2,739,461   3/1956   Canter -------- 222---179X" insert
--2,921,605   1/1960   Booth et al --- 222---144.5
  3,119,485   1/1964   Bayers, Jr. --- 222---129.4
  3,119,527   1/1964   Dyer ---------- 222---144.5
  3,305,132   2/1967   Coja ---------- 222---129.4--3-30-65
  3,305,136   2/1967   Harris -------- 222---144.5--9-24-65--
```

SIGNED AND
SEALED

DEC 23 1969

(SEAL)
Attest:

Edward M. Fletcher, Jr.
Attesting Officer

WILLIAM E. SCHUYLER, JR.
Commissioner of Patents